March 5, 1968   R. H. CONNORS ET AL   3,371,731
VIBRATION-PROOF WEIGHING SCALE WITH FLEXURE PIVOTS
Filed March 15, 1966   3 Sheets-Sheet 1
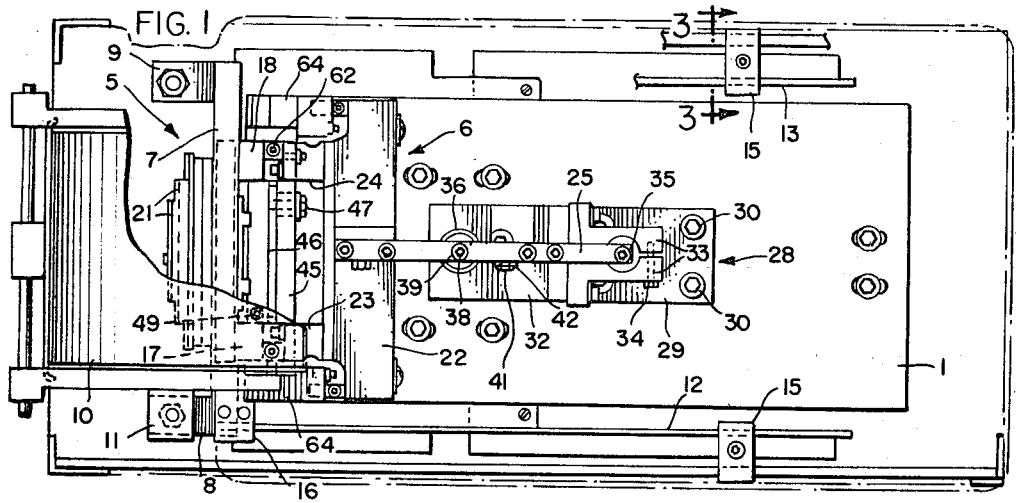
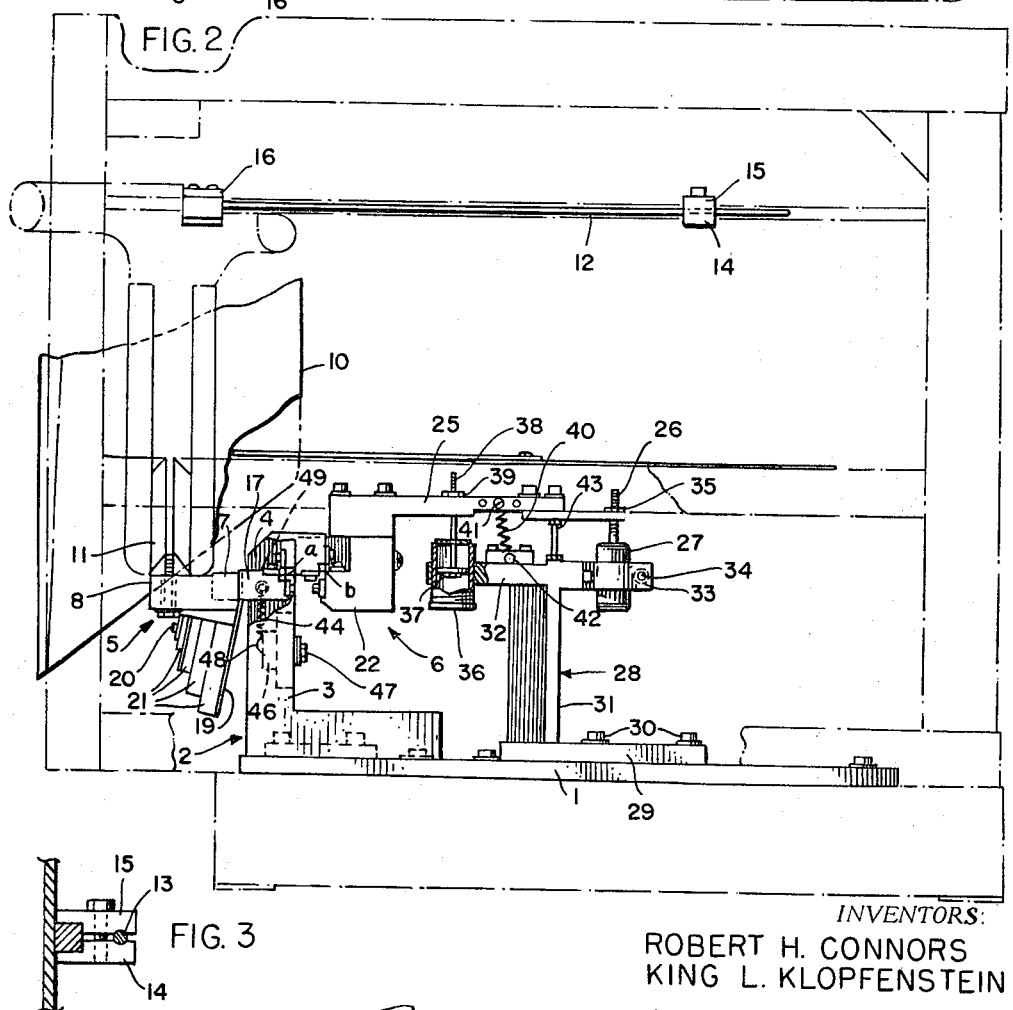
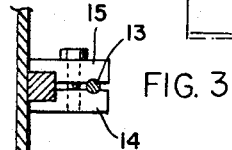
INVENTORS:
ROBERT H. CONNORS
KING L. KLOPFENSTEIN
BY Marzall, Johnston, Cook & Root
ATT'YS

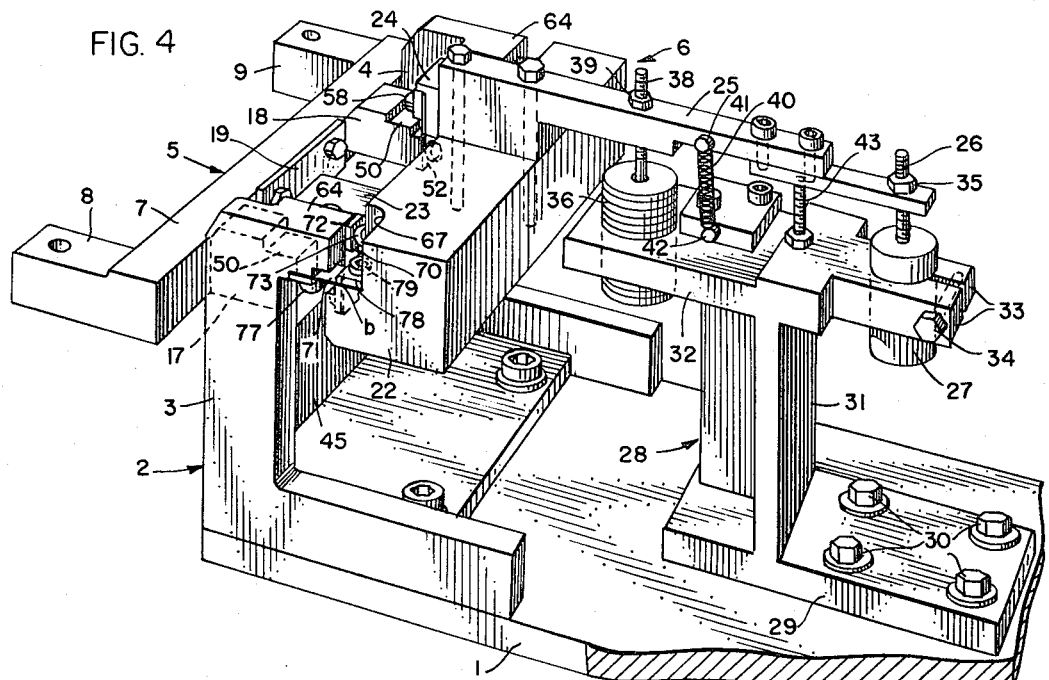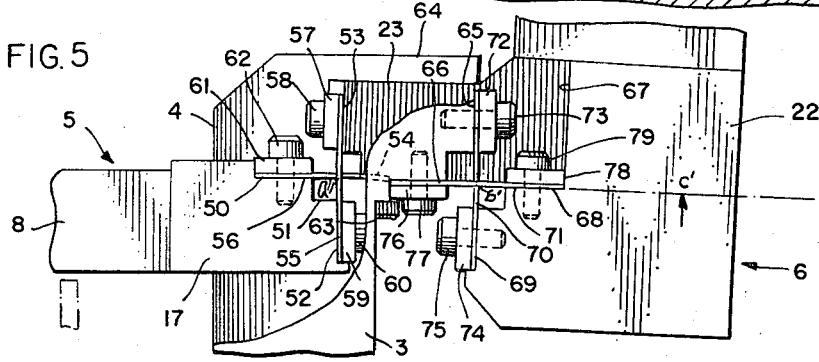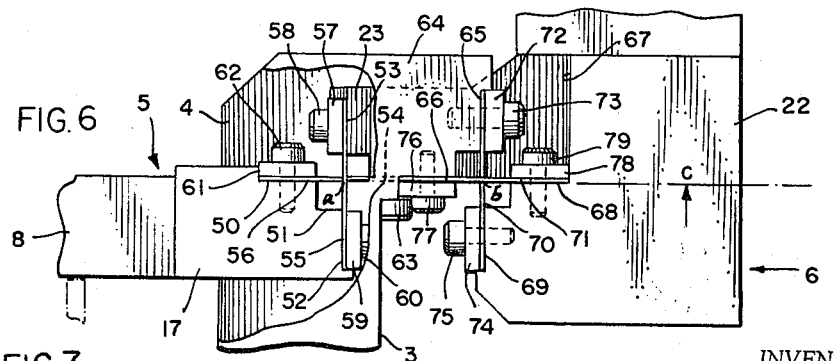

March 5, 1968 R. H. CONNORS ET AL 3,371,731
VIBRATION-PROOF WEIGHING SCALE WITH FLEXURE PIVOTS
Filed March 15, 1966 3 Sheets-Sheet 3

INVENTORS:
ROBERT H. CONNORS
KING L. KLOPFENSTEIN
BY: *Marzall, Johnston, Cook & Root*
ATT'YS

United States Patent Office 3,371,731
Patented Mar. 5, 1968

3,371,731
VIBRATION-PROOF WEIGHING SCALE WITH FLEXURE PIVOTS
Robert H. Connors, Chicago, and King L. Klopfenstein, Prospect Heights, Ill., assignors to Triangle Package Machinery Company, Chicago, Ill., a corporation of Illinois
Filed Mar. 15, 1966, Ser. No. 536,215
21 Claims. (Cl. 177—47)

This invention relates in general to weighing scales and especially to scales adapted to weigh a product having a predetermined weight.

As illustrated herein, the scale embodying the present invention is particularly well adapted for use as a net weighing scale wherein a flowable solid material is fed into a weigh bucket and, at a given signal responsive to movement of the weigh bucket, the feed thereof is stopped so that the final weight in the weigh bucket will be a predetermined amount. The product so weighed is then dumped from the weigh bucket into a package. While the filled package is being removed and another taking its place, the procedure is repeated.

A common use for net weighing scales is in conjunction with bag making machines wherein the scale is secured to the machine frame at the top thereof and the sensing device of the scale, as the flowable product is fed to the weigh bucket, will cut off the feed thereof at a predetermined weight.

As will be brought out more fully hereinafter, many features of the scale embodying the present invention enable it to be used for purposes other than as a net weighing scale. For example, it may be possible to use the scale in connection with a check weighing system wherein a package supposedly containing a predetermined weight of product is placed on the load receiving member of the scale, and wherein the sensing device thereof, instead of being operable to cut off the feed of product, acts to select packages having weights within a predetermined maximum and minimum.

Throughout the specification reference will be made from time to time to certain terms which should be defined at the outset. For example, the term "repeatability" will be mentioned. In the case of the repeatability of the scale mechanism, this means the ability of the scale mechanism to return to the same position with the same weight on its load receiving member each and every time.

Reference will also be made to the repeatability of the sensing device. This refers to the ability of the sensing device to operate at the same position of the scale mechanism each and every time.

In referring to the ounces per inch rate, what is meant is the number of ounces placed on the load receiving member divided by the corresponding motion of the scale mechanism in inches at the sensing device. It will be apparent that the ounces per inch should be as low as possible so as to reduce the repeatability requirement of both the scale mechanism and the sensing device.

"Response time" refers to the time elapsed between (a) the instant that the load receiving member contains a predetermined weight, and (b) the instant that the sensing device operates. The response time is also equal to the period of one cycle of undamped oscillation of the scale mechanism. For example, if the controlled damping means were removed and the scale mechanism allowed to oscillate freely, the number of oscillations per second could be counted and the exact time of one oscillation would be the response time.

There are three important factors necessary to achieve optimum scale performance. These are: immunity to external vibration, rapid response time as defined above, and the ability to detect extremely small changes in weight.

Vibration immunity in combination with rapid response time will be considered first. Vibration immunity is an important factor where scales are mounted on machines, such as bag making machines. Where vibrations due to machine operations are imparted to the scale, there is the possibility that the scale mechanism will be jarred, causing relative motion between the weighing element and the sensing device. This results in a scale weigh error proportional to the relative motion. A scale which has a balanced mass moment in the horizontal plane has a high degree of immunity to external vertical vibrations because all scale parts move in unison with the vibrations. When the scale has a balanced mass moment in both the horizontal and vertical planes, then an immunity to vibration in all planes containing the pivot axis results.

In the scale embodying the present invention there is a first weighing element, the mass of which acts through a predetermined point which, in the illustrated embodiment, is a movable pivot axis. Such first weighing element includes a load receiving member which is rotatable about a fixed pivot axis. There is also a second weighing element which is caused to move about the same fixed pivot axis a predetermined distance depending upon the weight of the product being weighed. The moment arm of the first weighing element is the horizontal projection of the distance between the point through which the mass acts (in this case the movable pivot axis) and the fixed pivot axis. The movement arm of the second weighing element is the horizontal projection of the distance between the center of gravity thereof and the fixed pivot axis.

All scales require a weighing means, that is, a means of causing a vertical change in the position of the load receiving member proportional to the change of weight thereon. A mechanism having balanced mass moments is not in itself a scale because it lacks a weighing means. A slight increase in one of the masses would cause that mass to rotate downwardly 90°.

In the prior art, some scales have included an underslung pendulum as a weighing means. However, these scales have the disadvantage of a slow response time and, although they are relatively immune to vibrations in a vertical plane, they are very susceptible to any vibrations other than those in a vertical plane.

Some prior art scales have used an unbalanced mass system wherein a spring force serves both as a support for the load receiving member with the product thereon being weighed, and as a weighing means. These scales could have a fast response time; however, they have no immunity to vibrations other than those in a horizontal plane.

Heretofore only this latter arrangement has been available in the art for high speed weighing. In the present invention spring forces are used only to provide a rapid and proportional change of position for a given change of weight in the load receiving member. A mass moment alone, and not a spring force moment, is used to counterbalance the mass moment of the load receiving member and the product being weighed, i.e., the mass moments are equal when the predetermined weight is on the load receiving member. This may be done in several different ways. A tension spring may be connected to each of the weighing elements whereby equal force moments will be exerted by each spring when the mass moments are balanced, such as illustrated herein. A second way would be to put a tension spring on one weighing element pulling upwardly and another on the same element pulling downwardly. The spring force moments cancel out each other when the mass moments are balanced. A third way would be to take the balanced mass moment system and use a straight stabilizer wire connected to the load receiving member. This wire would exert a spring force on the system until sufficient weight was added to the load receiving member to bring the mass moments of the weighing elements into balance. A fourth way would be to utilize spring cross flexures as pivots and use the spring forces inherent in the cross flexures. These flexures would exert a spring force until sufficient weight was added to the weigh bucket to bring the mass moments into balance.

Thus, the balanced mass moment system in a horizontal plane, having a balanced spring force moment drive, achieves increased immunity to external vibrations in combination with rapid response.

Rapid response time in combination with ability to detect minimum changes in weight will be considered next. Ablity to detect is related to the ounces per inch rate through repeatability of the scale mechanism and repeatability of the sensing device as given by the following formula:

$$A_{minimum} = (R_{sm} + R_{sd})X$$

wherein $A_{minimum}$ is the smallest change in weight in ounces which the scale can detect, $R_{sm}$ is the repeatability of the scale mechanism in inches, $R_{sd}$ is the repeatability of the sensing device in inches, and X is the ounces per inch rate, all as herein previously defined.

Response time is related to the ounces per inch rate by the following formula:

$$T = 2\pi \sqrt{\frac{M_1 a^2 + M_2 b^2}{.75 algX}}$$

where T is the response time of the scale mechanism in seconds, X is the ounces per inch rate, $a$ is the moment arm of the first weighing element in inches, $l$ is the distance between the fixed pivot and the sensing device in inches, hereinafter referred to as the multiplier beam, $g$ is the acceleration of gravity in feet per second squared, $b$ is the moment arm of the second weighing element in inches, $M_1$ is the total weight of the first weighing element together with the weight of the product being weighed in pounds, and $M_2$ is the total weight of the second weighing element in pounds. In the above formula it is assumed that the moment arms $a$ and $b$ are substantially equal to the true distances of which they are the horizontal projections.

It will be apparent from the above formula that the response time is (1) Proportional to the square root of the weight of the system,
(2) Proportional to the length of the moment arms,
(3) Inversely proportional to the square root of the ounces per inch rate,
(4) Inversely proportional to the length of the multiplier beam, and that for a given response time increasing the length of the multiplier beam reduces the ounces per inch rate.

In the present invention we have made $M_1$, $M_2$, $a$, and $b$ as small as practical. We have also mounted a long, lightweight multiplier beam on the second weighing element, which increases $l$ without significantly increasing either $b$ or $M_2$.

With the foregoing considerations in mind, it is one of the principal objects of the present invention to provide a weighing scale which has the features of rapid response, as well as greater ability to detect extremely small changes in weight, combined with greater immunity to external vibrations than has heretofore been possible with other scales.

Another object is to provide a weighing scale having a relatively short moment arm for each of the weighing elements, thereby to improve the speed of response.

A further object of the invention is to provide a scale which has a substantially balanced mass moment system in both horizontal and vertical planes whereby immunity to vibrations from external sources is greatly increased.

Still another object of the invention is to provide a scale wherein the mass weight of the scale system remains constant for all weights which the system is capable of weighing, whereby the reponse time and action of the damping device will also remain constant without adjustment, thus overcoming the disadvantages of other scales where the mass weight increases with an increase of the load to be weighed and consequent increasing of response time, and necessity of adjusting the damping device.

A still further and more specific object of the invention is to provide a scale wherein the scale beam or moment arm is considerably shorter than the moment arms in similar types of scales heretofore known, and preferably is no greater than about 2 inches, thereby making the speed of response greater than has heretofore been possible and yet keeping the ounces per inch of travel relatively low.

Still another and specific object of the invention is to provide a scale which has a response time within the range of about ⅓ to 1/15 second and preferably of the order of from ¼ to 1/10 second.

A still further object of the invention is to provide a scale having a balanced mass moment system wherein the pivot axes of the scale consist of spring cross flexures, thus increasing the repeatability of the scale mechanism.

Another object is to provide a net weighing scale having a balanced mass moment system wherein the spring force moments have substantially zero torque at final weight.

Another and still more specific object of the invention is to provide a scale wherein the second weighing element includes a lightweight and rigid multiplier beam extension on which may be mounted the dash pot plunger and signal device actuator, thereby to mechanically increase the motion of both said plunger and actuator.

Other objects and advantages of the invention will become apparent upon reading the following description taken in conjunction with the accompanying drawings, in which:

FIG. 1 is a top plan view of a scale embodying the present invention with certain parts thereof broken away for the sake of clarity;

FIG. 2 is a side elevational view of the scale shown in FIG. 1 with certain parts thereof shown in section and certain other parts broken away for the sake of clarity;

FIG. 3 is a fragmentary transverse sectional view taken along the plane of line 3—3 of FIG. 1;

FIG. 4 is a perspective view of the scale of FIGS. 1 and 2 but showing the load receiving member removed therefrom;

FIG. 5 is a fragmentary enlarged elevational view illustrating the weighing elements and pivot axes as they appear in unbalanced condition and with certain parts of the structure broken away for the sake of clarity;

FIG. 6 is a view similar to FIG. 5 but showing the weighing elements and pivot axes thereof as they appear with the final or total weight of the product to be weighed on the load receiving members;

FIG. 7 is a diagrammatic illustration showing the condition and movements of the weighing elements in their unbalanced and balanced conditions;

Figure 8:
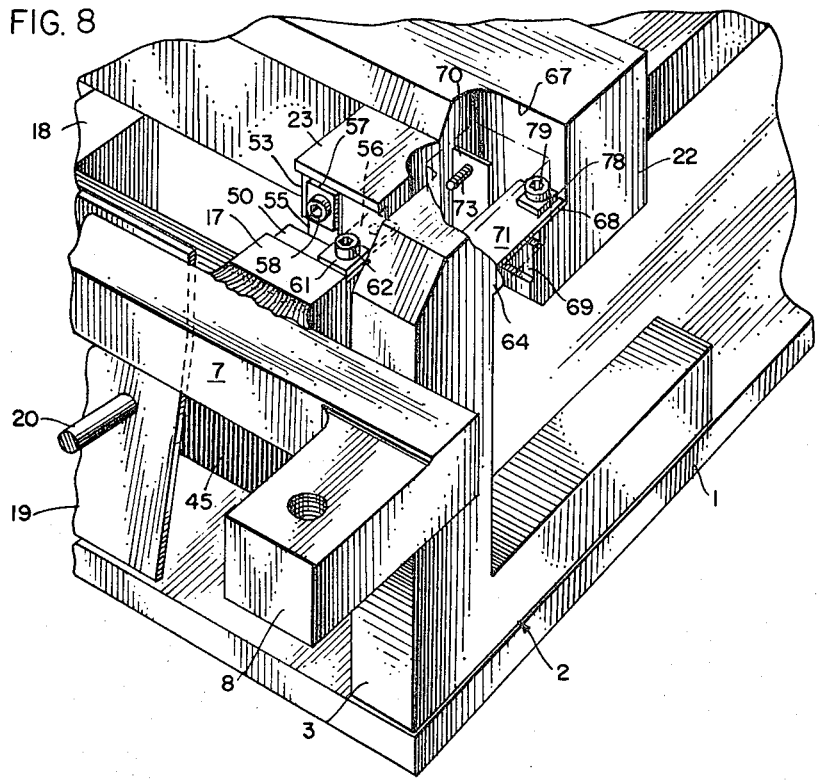
FIG. 8 is a fragmentary perspective view of a part of the scale assembly taken at approximately 90° toward the left of the view shown in FIG. 4.

Referring now more particularly to the drawings, the scale is one which is adapted to be used in connection with an operating machine such as, for example, a bag making machine, or a package filling machine, or a check weighing machine, which involves the use of moving packages on a conveyor, all as are well known in the art.

As illustrated herein, the scale comprises a base 1 having a frame thereon generally indicated by the numeral 2. The frame includes an upright member 3 at one side of the base and a similar upright member 4 at the opposite side of the base, as may be more clearly seen in FIGS. 1 and 4.

The scale structure embodies first and second weighing elements. The first weighing element includes the load receiving member and the second weighing element is the counterbalancing member. The first weighing element is indicated generally in the drawings by the numeral 5 and the second weighing element is indicated generally by the numeral 6.

The first weighing element includes a cross member 7 extending transversely of and supported above the base 1. This member 7 is provided with outwardly extending supporting lugs 8 and 9 at each end thereof. The cross member 7 and supports 8 and 9 comprise a mounting bracket for the load receiving member.

Depending upon the use to which the scale is to be put and the material or product to be weighed, the load receiving member may take any one of several forms. As shown herein for purposes of illustration where the scale is particularly adapted for use as a net weighing scale, the load receiving member takes the form of a weigh bucket 10. This weigh bucket is provided at each side thereof with outwardly extending lugs 11 which are secured to the supports 8 and 9 and thus forms a part of the mass of the first weighing element.

It is desirable that the weigh bucket remain in an upright position at all times during the feeding of the material to be weighed into the bucket and during its movement downwardly with the other members of the weighing element when the predetermined weight has been received. For this purpose upper and lower stabilizer means may be connected to the bucket and, as shown herein, the upper stabilizer means includes a pair of stabilizer wires 12 and 13. The outermost ends of each stabilizer wire are securely mounted between clamping jaws 14 and 15, as more clearly shown in FIGS. 1, 2 and 3. The end of each stabilizer wire adjacent the weigh bucket is similarly secured in place by means of a similar clamping member 16. In an unbalanced condition of the weighing elements, for example when the weigh bucket is empty, the stabilizer wires 12 and 13 will have a slight bend due to the fact that the location of the ends thereof adjacent the bucket will be higher than the opposite ends. Thus, as the weigh bucket moves downwardly with the first weighing element due to the weight of the product being weighed, the stabilizer wires will unbend and will exert a decreasing force on the first weighing element. Such force then becomes substantially zero at final weight. The lower stabilizing means may take the form of spring members similar to the stabilizer wires 12 and 13, or flat springs such as those shown at 56, as will be described more fully hereinafter.

The first weighing element also includes a pair of mounting lugs to support a part of the first pivot system. As mentioned briefly hereinabove, the pivot axes are preferably formed of spring cross flexures. It will be understood, however, that the fulcrum and other pivot axes may, if desired, utilize the well known knife edge construction. Knife edge pivots, however, have the disadvantage that the element of friction is introduced and the less friction in the scale system, the better will be the performance thereof with respect to the repeatability of the scale mechanism.

Spring flexures in scale systems have been used heretofore, but insofar as we are aware they have not been used in the same manner and arrangement as they are in the present invention. The details of the pivot systems embodying the spring cross flexures will be dealt with in more detail hereinafter.

The first weighing element includes, in addition to those heretofore mentioned above, a pair of mounting lugs 17 and 18 secured to or formed integral with the cross member 7 and extending in a direction opposite from that of the supports 8 and 9. These lugs 17 and 18 are used for the purpose of mounting thereon certain of the cross flexures which form a part of the first pivot system.

The first weighing element also includes a mounting plate 19, as shown particularly in FIGS. 1, 2 and 8, which is provided with a plurality of studs 20. A plurality of poise weights 21 are mounted on the studs 20 and become a part of the first weighing element.

As will become evident more clearly hereinafter, the total weight of the poise weights will preferably equal the total weight which the scale is capable of weighing. These poise weights are present as a part of the first weighing element when the scale is initially brought into balance. The poise weights have different weight values and certain of the weights may be removed for a given weighing operation wherein the total of the weights removed will equal the weight of the product to be weighed. That is to say, if the total of the poise weights is 5 pounds and the scale has been balanced so that the mass moment of the first and second weighing elements are substantially equal, and it is desired to measure out a quantity of material which weighs 2 pounds, then poise weights having a total weight value of 2 pounds will be removed from the mounting plate 19 before the weighing operation begins. Thus, when the load receiving member has a product thereon having a weight value of 2 pounds, the mass moments of the two weighing elements will again be equal.

A second transversely extending bar 22 acts as the main part of the second weighing element which forms the counterbalance for the first weighing element. It is important to note that substantially all of the mass of the second weighing element is built into and is an integral part of this bar 22. This is important from the standpoint of obtaining a moment arm or a scale beam for the second weighing element which is as short as possible.

The bar 22 has a pair of mounting lugs 23 and 24 extending therefrom toward the cross bar 7 and form supports for a part of the second pivot system. These lugs are more clearly shown in FIGS. 1 and 4.

A very lightweight multiplier beam 25 is mounted at one end on the bar 22 and forms a part of the second weighing element. Near the outer free end of the multiplier beam 25 there is rigidly mounted thereon the activator 26 of a sensing device 27.

This sensing device is for the purpose of signaling when a predetermined weight of product has been fed to the weigh bucket in the case of a net weighing scale. In this instance the signal of the sensing device acts to stop the flow of material to the weigh bucket. If the scale is used for other purposes, for example, in a check weighing machine, then the signal at a given weight could perform other functions, such as accepting or rejecting packages which have a predetermined weight within certain desirable limits.

There are a number of sensing devices capable of use in connection with the scale as shown herein, but in actual practice it has been found that a differential transformer works exceedingly well. Since differential transformers may be obtained on the open market, there is no reason to describe one in detail here except to note that in the scale as shown in the drawings the second weighing element, including the multiplier beam 25, will move upwardly upon the application of a predetermined weight to the load receiving member. The activator 26 is adjusted so that the upward movement thereof a predetermined distance within the device 27 will trigger a signal which will, in the case of a net weighing scale, stop the flow of material to the weigh bucket.

In packaging machines where a flowable material is fed to a weigh bucket before being dumped in the package, it is customary to have what is known as a bulk feed and a dribble feed. Depending upon the material being fed, the dribble feed might be dispensed with, in which case the sensing device would trigger the signal to stop flow of all material to the weigh bucket when a predetermined weight has been reached.

Where a dribble feed is also utilized, the sensing device will trigger two signals, the first to stop the bulk feed and the second to stop the dribble feed. Since such feeding devices for package machines are well known in the art, as well as their manner of operation, and the manner in which the feed is controlled, it is unnecessary to describe the operation thereof in detail.

The body of the sensing device 27 is supported by a secondary framework or support member 28 which has a base 29 secured to the base 1 of the scale by means such as bolts 30. This support member is provided with an upright 31 which has at its upper end a top plate 32. The end of such plate below the outer free end of the multiplier beam 25 is longitudinally split to provide jaws 33 between which the sensing device 27 may be clamped by means such as bolts 34. The activator 26 may be adjusted by means of the nut 35.

Intermediate the ends of the multiplier beam 25 there is positioned a dash pot for damping the oscillations of the weighing elements. The dash pot cylinder 36 is supported by the plate 32 at the end thereof opposite the sensing device 27. The cylinder 36 has therein the customary damping fluid which acts upon the piston 37 which reciprocates therein. The rod 38, which is connected at its lower end to the piston 37, is secured adjustably to the multiplier beam 25 by means of the adjusting nut 39.

A coiled tension spring 40 is secured at its upper end to a suitable support means 41 mounted on the multiplier beam 25. The support means 41 may assume any desired form such as a clamp, screw, or the like. The opposite end of spring 40 is secured to a similar support member 42 mounted on the plate 32.

The spring 40 exerts a downward force or pull on the multiplier beam 25 and urges it into contact with the adjustable stop member 43 also mounted on the plate 32.

Figure 9:
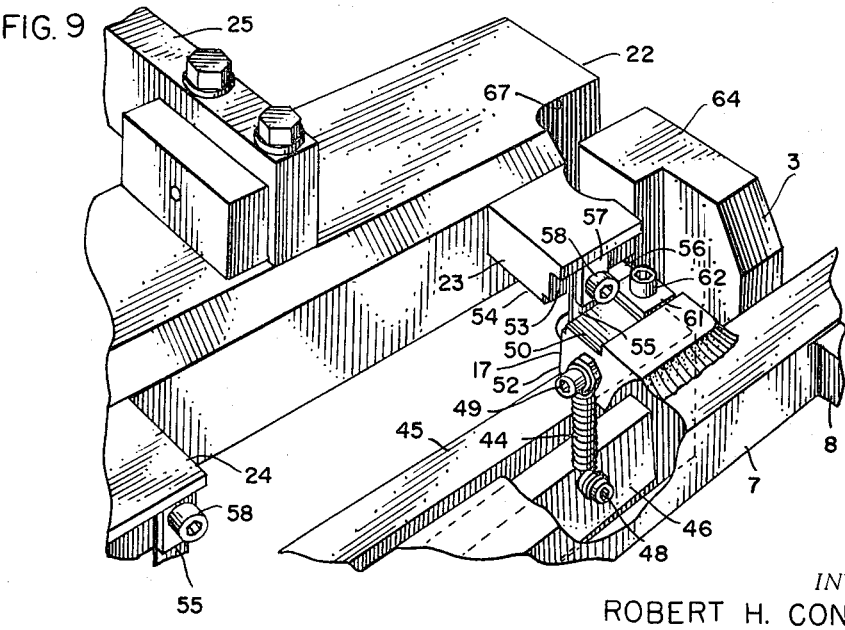
FIG. 9 is a fragmentary perspective view of a part of the scale assembly shown in FIG. 8 but taken from a position approximately 90° toward the left thereof.

To balance the force moment of spring 40 there may be provided a tension spring 44, as illustrated more clearly in FIGS. 2 and 9, which exerts a downward force or pull on the first weighing element. The spring 44 is so mounted that the tension thereof, and thus the force moment exerted thereby, is adjustable. This is made possible by reason of the fact that a mounting plate 45, which extends between the uprights 3 and 4, rotatably supports the spring adjusting bar 46. One end of the bar 46 is mounted on the plate 45 by means of a bolt 47 (see FIGS. 1 and 2). The opposite end of the bar 46 is provided with a supporting stud or clamping member 48 which supports the lower end of spring 44. The upper end of the spring is similarly mounted on the mounting lug 17 by means of a stud or clamping member 49.

It is thus evident that by loosening the bolt 46 the bar 46 may be raised or lowered to decrease or increase the force exerted by spring 44, and when the bolt 47 is tightened the spring adjusting bar 46 will remain locked in the adjusted position.

The mounting lugs 17 and 18 are constructed similarly so that a description of one will suffice for both. Each lug has an upper surface which is offset downwardly to provide a horizontal shelf 50. A second offset 51 extends to the end of the lug and provides a substantially vertically extending face 52.

The mounting lugs 23 and 24 are also similarly formed and a description of one will suffice for both. Each lug has an undercut portion thereby providing a substantially vertical face 53. A lomer recess in each lug provides on the lower part thereof a substantially horizontally extending face 54. The formation of these lugs may be seen more clearly by viewing especially FIGS. 5, 6, 8, and 9.

As illustrated herein, there are a pair of vertical flat springs 55 and a pair of horizontal flat springs 56 both of which combine to form a cross flexure. There are two such cross flexures, one for the lugs 17 and 23 at one side of the scale, and 18 and 24 at the opposite side of the scale. As shown, these cross flexures have the individual flat springs thereof disposed at right angles to each other, the one being vertical and the other being horizontal. It will be understood, of course, that as long as the perpendicular relationship between the individual spring members is maintained, it is immaterial whether they are vertical and horizontal or disposed at some other angle.

As may be clearly seen in FIGS. 5 and 6, the vertical spring members 55 of the cross flexures each has its upper end secured to a face 53 of the lug 23 and lug 24, respectively. The upper end of each is secured in place by means of a clamping member 57 and a screw 58.

The lower end of each flexure 55 is clamped against the vertical face 52 of each of the lugs 17 and 18 by means of a clamping member 59 and a screw 60. The mass of the first weighing element with the weight thereon will act through these vertical flexures 55.

Each horizontal spring flexure 56 is mounted at one end thereof on the horizontal shelf 50 of each of the lugs 17 and 18 by means of a clamping member 61 and a screw 62. The opposite end of each flexure 56 is clamped securely against the underside or horizontal face 54 of each lug 23 and 24. While the clamping member is not visible in the figures, nevertheless the screw 63 will pass through a similar clamping member and the end of the flexure in the manner heretofore described.

These horizontal flexures 56 comprise the lower stabilizer means for the weigh bucket, as mentioned hereinabove, and must have one end thereof secured to the first weighing element or directly to the weigh bucket. When the flexures 56 cross the flexures 55, a horizontal line passing through the points at which they cross forms the pivot axis for the first pivot system. This pivot axis is indicated by the letter $a$. It will be noted that the first weighing element will rotate about the pivot axis $a$ and, at the same time, the pivot axis $a$ moves downwardly when a predetermined weight is placed on the load receiving member, as will be discussed more fully hereinafter.

In the second pivot system associated with the second or counterbalancing weighing element, a part thereof is mounted on the frame 2 and another part is mounted on the second weighing element. The uprights 3 and 4 of each frame member 2 terminate at their upper ends in a horizontally extending top portion 64. Each extension 64 terminates in a wall which is provided with an offset portion thereby resulting in a substantially vertical face 65. A second downwardly spaced offset results in a lower horizontal face 66.

Each end of the bar 22 is recessed, as at 67 (see particularly FIGS. 8 and 9), to provide a substantially horizontal face or shelf 68. Below the shelf 68 the bar 22 is further offset to provide a substantially vertically extending face 69.

The second pivot system, as illustrated herein, consists of the vertical and horizontal cross flexures 70 and 71, respectively. The upper end of the flexure 70 is clamped against the vertical face 65 on the extension 64 by means of a clamping member 72 and a screw 73. The lower end of this flexure is clamped against the face 69 on the bar 22 by means of the clamp 74 and screw 75. One end of the horizontal flexure 71 is clamped against the substantially horizontal face 66 by means of the clamp 76 and screw 77 while the opposite end thereof is clamped against the shelf 68 by means of the clamp 78 and screw 79.

It will thus be seen that the second pivot system is mounted partially on the frame 2 and partially on the bar 22 of the second weighing element.

A horizontal line passing through the points at which the vertical and horizontal flexures 70 and 71 cross provides the pivot axis for the second weighing element. This pivot axis is indicated in the drawings by the letter $b$ and is fixed so that it acts as the fulcrum for the scale about which the two weighing elements rotate.

Initially, as indicated above, the mass moments of the two weighing elements are balanced. That is to say, the weight of the specific items comprising the first weighing element multiplied by the distance from the plane or point through which the mass acts to the fixed pivot or fulcrum $b$, will substantially equal the total weight of the items comprising the second weighing element multiplied by the distance from the center of gravity of the total weight of the second weighing element to the fixed pivot or fulcrum $b$. These distances may be referred to as the moment arm of the first and second weighing elements, respectively.

In the case of the first weighing element, the mass acts through the movable pivot axis $a$ so that the mass moment of the first weighing element will be the weight thereof multiplied by the distance between the first or movable pivot axis $a$ and the second or fixed pivot axis $b$. Likewise, the distance between the center of gravity of the second weighing element and the fixed pivot $b$ may be referred to as the moment arm of the second weighing element.

Initially, the weight of the first and second weighing elements are made so that the mass moment of one is substantially equal to the mass moment of the other. As stated above, it is extremely important that the moment arm in each case be as short as possible. The weight of the first weighing element includes the poise weights 21, and all the poise weights are in place when the scale is initially balanced. When the scale is balanced, the positions of the weighing elements, their cross flexures and the pivot axes will be as shown in FIG. 6 wherein the axes $a$ and $b$ and the center of gravity of the second weighing element acting through point $c$ will be in a substantially horizontal plane.

As mentioned above, in order that this arrangement be made to operate as a scale, spring forces are applied. The spring 40 is attached in place which exerts a downward force on the second weighing element, and the spring 44 is placed so as to exert downward force on the first weighing element. The adjusting bar 46 is moved upwardly or downwardly, as the case may be, to regulate the tension of the spring 44 so that the spring force moments of the springs 40 and 44 will be substantially equal and in balance. In this position of the parts the multiplier beam 25 will be elevated out of contact with the stop member 43. All four of the flexure members 56 and 71 will be in a substantially horizontal plane, as illustrated in FIG. 6.

As stated heretofore, the spring force which opposes that of spring 40 could, if desired, be applied on the second weighing element to exert an upward force thereon instead of exerting a downward force on the first weighing element. Likewise these spring forces could be all built into the cross flexures or into the stabilizer wires, if desired.

When the desired weight to be applied to the load receiving member of the first weighing element has been determined by the user of the scale, then poise weights in the value of such predetermined weight will be removed from the mounting plate 19. For example, if it is desired to weigh 2 pounds of material, then poise weights in the value of 2 pounds will be removed from the first weighing element. This is true whether the scale is to be used as a net weighing scale or as part of a check weighing machine.

At this time, then, the scale will become unbalanced but when the predetermined weight of material has been added to the first weighing element, the scale will again be in balance and the mass amount of each weighing element will be substantially equal. As pointed out above, in this construction of scale the mass on each side of the fulcrum $b$ will remain constant at final weight regardless of the value of that weight, thus causing all of the variables in the aforementioned formula to remain constant. In scales of this type heretofore known, weights have been added to the counterbalancing weight in an amount equal to the weight of the product to be weighed. When this occurs, the mass of both weighing elements is increased and this, of course, will make the response time slower.

FIG. 7 illustrates diagrammatically the positions and movements of the axes $a$, $b$ and point $c$ above referred to. Initially, when the scale is first balanced the movable pivot $a$, the fixed pivot $b$, and the point $c$, will all be in a horizontal plane. When the poise weights are removed in an amount equal to the value of the product to be weighed, the scale will be unbalanced and the pivot axis $a$ will move upwardly to its position shown at $a'$ in FIG. 7, while the point $c$ will move downwardly to its position indicated by $c'$. The fulcrum or fixed pivot axis $b$ will remain stationary.

When the material to be weighed has been placed on the load receiving member, which will be the final weight in the case of a net weighing scale, the movable pivot $a$ will move from its position at $a'$ downwardly to its position $a$, and the point $c$ will move upwardly from its position $c'$ to its position at $c$. At this time again the mass moment of the two weighing elements will be substantially equal in a horizontal plane.

The design of the scale embodying the present invention and as illustrated herein also has a balanced mass moment system in the vertical plane. That is to say, at final weight the vertical distance between a horizontal plane passing through the pivot axis $a$ and a horizontal plane passing through the fixed pivot axis $b$ will be substantially zero. Also the vertical distance between a horizontal plane passing through fixed axis $b$ and a horizontal plane passing through the center of gravity $c$ of the second weighing element will be substantially zero. Thus, the scale's immunity to external vibrations as to their horizontal and vertical components will have been increased greatly so that when the scale is mounted on an operating machine, the accuracy thereof will be greater than that which has been heretofore possible in scales which have unbalanced mass moments.

From the foregoing description it will be evident that we have designed a weighing scale having numerous advantages and novel features not present in scales heretofore known. One of the most important features is the balancing of the mass moment at least in a horizontal plane and making the moment arms as short as possible. The desired results will not be achieved if the moment arms are substantially in excess of 2 inches.

Rapid response time of the order of from $\frac{1}{3}$ to $\frac{1}{15}$ second may be obtained with the scale embodying the present invention, and more particularly it is possible to obtain response time of the order of $\frac{1}{4}$ to $\frac{1}{10}$ second.

The balanced mass moment in a horizontal plane greatly increases the immunity of the scale to external vibrations and the balanced mass moment in the vertical plane will increase this immunity still more.

Changes may be made in the form, construction and arrangement of parts from those disclosed herein without in any way departing from the spirit of the invention or sacrificing any of the attendant advantages thereof, provided, however, that such changes fall within the scope of the claims appended hereto.

The invention is hereby claimed as follows:

1. A weighing scale having a substantially equal mass moment system, comprising
   (a) a frame,
   (b) a first movable weighing element, including a load receiving member adapted to receive a quantity of a product to be weighed and having a predetermined mass,
   (c) a second movable weighing element having a predetermined mass,
   (d) a substantially vertical flexible member connecting said first weighing element to said second weighing element,
   (e) guide means associated with said first weighing element to insure movement thereof in a substantially vertical path during the weighing operation, (f) a pivot system having the pivot axis thereof fixed,
 (1) a part of said pivot system being supported by said frame, and
 (2) another part thereof being mounted on said second weighing element,
(g) spring means acting upon said weighing elements to control the movement thereof when weight is added to said load receiving member, the torque of said spring means being substantially zero at the time the quantity of product to be weighed is on said load receiving member,
(h) the mass of said first weighing element together with the product thereon being weighed, acting through said flexible member, multiplied by the distance from said flexible member to said fixed pivot axis, and the mass moment of said second weighing element being substantially equal in a horizontal plane through said fixed pivot axis, whereby a substantially balanced mass moment system in said horizontal plane is achieved.

2. A weighing scale as defined in claim 1 wherein the speed of response of said spring means and balanced mass moment system is of the order of from $\frac{1}{3}$ to $\frac{1}{15}$ second.

3. A weighing scale as defined in claim 1 wherein the speed of response of said spring means and balanced mass moment system is of the order of from $\frac{1}{4}$ to $\frac{1}{10}$ second.

4. A weighing scale as defined in claim 1 wherein the product being weighed is a flowable solid material, and including means to direct the flow of material to said load receiving member, and a sensing device operable in response to movement of said second weighing element through a predetermined distance to stop the flow of material to said load receiving member.

5. A weighing scale as defined in claim 1 wherein said second weighing element includes a multiplier beam, and a sensing device having an actuator mounted on said beam operable in response to a predetermined weight on said load receiving member to indicate the presence thereon of said predetermined weight, said beam acting to move said actuator through a distance greater than the distance through which said first weighing element is moved.

6. A weighing scale as defined in claim 1 wherein said guide means includes a substantially horizontally positioned stabilizer wire and a substantially horizontally positioned flat spring member.

7. A weighing scale as defined in claim 6 wherein said flat spring member is connected to said first and second weighing elements.

8. A weighing scale as defined in claim 1 including a dash pot having a piston and piston rod movable therein, and means rigidly mounting said piston rod on said second weighing element to position said piston in substantially the same horizontal plane with said fixed pivot axis.

9. A weighing scale as defined in claim 1 wherein said second weighing element includes a member to which a part of said pivot system is mounted and the major portion of the mass of said second weighing element is included in said member.

10. A weighing scale as defined in claim 1 including a plurality of poise weights removably mounted on said first weighing element, the combined weight thereof being substantially equal to the maximum weight which the scale is capable of weighing, whereby removal of at least some of said weights having a total weight value substantially equal to the total weight value of the product to be weighed, will maintain the mass weight of the system constant for any of the weights which the system is capable of weighing when the total weight value of the product to be weighed is on said load receiving member.

11. A weighing scale having a substantially equal mass moment system, comprising (a) a frame,
(b) a first movable weighing element, including a load receiving member adapted to receive a quantity of a product to be weighed and having a predetermined mass,
(c) a second movable weighing element having a predetermined mass,
(d) a first pivot system having the pivot axis thereof movable,
 (1) a part of said first pivot system being on said first weighing element, and
 (2) another part thereof being mounted on said second weighing element,
(e) a second pivot system having the pivot axis thereof fixed,
 (1) a part of said second pivot system being supported by said frame, and
 (2) another part thereof being mounted on said second weighing element,
(f) spring means acting upon said weighing elements to control the movement thereof when weight is added to said load receiving member, the torque of said spring means being substantially zero at the time the quantity of product to be weighed is on said load receiving member,
(g) the mass of said first weighing element together with the product thereon being weighed, acting through said movable pivot axis, multiplied by the distance between said pivot axes, and the mass moment of said second weighing element, being substantially equal in a horizontal plane through said fixed pivot point, and
(h) the mass of said first weighing element, together with the product thereon being weighed, acting through said movable pivot axis multiplied by the vertical distance between horizontal planes passing through said pivot axes, and the mass moment of said second weighing element in a vertical plane, each being substantially zero around said fixed pivot axis,
(i) whereby a substantially balanced mass moment system in both said planes is achieved.

12. A weighing scale as defined in claim 11 wherein the speed of response of said spring means and balanced mass moment system is of the order of from $\frac{1}{3}$ to $\frac{1}{15}$ second.

13. A weighing scale as defined in claim 11 wherein the speed of response of said spring means and balanced mass moment system is of the order of from $\frac{1}{4}$ to $\frac{1}{10}$ second.

14. A weighing scale as defined in claim 11 wherein said second weighing element includes a multiplier beam, and a sensing device having an actuator mounted on said beam operable in response to a predetermined weight on said load receiving member to indicate the presence thereon of said predetermined weight, said beam acting to move said actuator through a distance greater than the distance through which said first weighing element is moved.

15. A weighing scale as defined in claim 11 wherein each of said first and second pivot systems includes a plurality of cross flexes forming the movable and fixed pivot axes respectively.

16. A weighing scale as defined in claim 11 wherein said second weighing element includes a member to which a part of said pivot system is mounted and the major portion of the mass of said second weighing element is included in said member.

17. A weighing scale having a substantial equal mass moment system, comprising (a) a frame,
(b) a first movable weighing element, including a load receiving member adapted to receive a quantity of a product to be weighed and having a predetermined mass,
(c) a second movable weighing element having a predetermined mass, (d) a first pivot system having the pivot axis thereof movable,
 (1) a part of said first pivot system being on said first weighing element, and
 (2) another part thereof being mounted on said second weighing element,
(e) a second pivot system having the pivot axis thereof fixed,
 (1) a part of said pivot system being supported by said frame, and
 (2) another part thereof being mounted on said second weighing element,
(f) spring means acting upon said weighing elements to control the movement thereof when weight is added to said load receiving member, the torque of said spring means being substantially zero at the time the quantity of product to be weighed is on said load receiving member,
(g) the mass of said first weighing element together with the product thereon being weighed, acting through said movable pivot axis, multiplied by the distance between said pivot axes, and the mass moment of said second weighing element being substantially equal in a horizontal plane through said fixed pivot axis, whereby a substantially balanced mass moment system in said horizontal plane is achieved, and
(h) the speed of response of said spring means and said balanced mass moment system being of the order of from ⅓ to ¹⁄₁₅ second.

18. A weighing scale as defined in claim 17 wherein each of said first and second pivot systems include a plurality of cross flexes forming the movable and fixed pivot axes respectively.

19. A weighing scale as defined in claim 17 wherein said second weighing element includes a member to which a part of said pivot system is mounted, and the major portion of the mass of said second weighing element is included in said member.

20. A weighing scale having a substantially equal mass moment system, comprising
(a) a frame,
(b) a first movable weighing element, including a load receiving member adapted to receive a quantity of a product to be weighed and having a predetermined mass,
(c) a second movable weighing element having a predetermined mass,
(d) a first pivot system having the pivot axis thereof movable,
 (1) a part of said first pivot system being on said first weighing element, and
 (2) another part thereof being mounted on said second weighing element,
(e) a second pivot system having the pivot axis thereof fixed,
 (1) a part of said second pivot system being supported by said frame, and
 (2) another part thereof being mounted on said second weighing element,
(f) spring means acting upon said weighing elements to control the movement thereof when weight is added to said load receiving member, the torque of said spring means being substantially zero at the time the quantity of product to be weighed is on said load receiving member,
(g) the mass of said first weighing element together with the product thereon being weighed, acting through said movable pivot axis, multiplied by the distance between said pivot axes, and the mass moment of said second weighing element, being substantially equal in a horizontal plane through said fixed pivot axis,
(h) the mass of said first weighing element, the product thereon being weighed, and said second weighing element, having a total weight of at least three pounds, and
(i) the distance between said movable pivot axis and said fixed pivot axis, and the distance between the center of gravity of said second weighing element and said fixed pivot each being no greater than two inches.

21. A weighing scale as defined in claim 20, wherein the speed of response of said spring means and balanced mass moment system is of the order of from ⅓ to ¹⁄₁₅ second.

References Cited

UNITED STATES PATENTS

| | | | |
|---|---|---|---|
| 1,128,128 | 2/1915 | Ghezzi | 177—188 |
| 3,148,742 | 9/1964 | Giulie | 177—168 X |
| 3,163,248 | 12/1964 | Farquhar | 177—188 X |

RICHARD B. WILKINSON, *Primary Examiner.*

G. H. MILLER, JR., *Assistant Examiner.*